(12) United States Patent
Elleman et al.

(10) Patent No.: US 8,475,865 B2
(45) Date of Patent: Jul. 2, 2013

(54) FOOD EMULSION

(75) Inventors: Carole Jean Elleman, Reading (GB);
Emilien Louis Joseph Esteve, Reading (GB)

(73) Assignee: Cadbury Holdings Limited (GB)

( * ) Notice: Subject to any disclaimer, the term of this patent is extended or adjusted under 35 U.S.C. 154(b) by 256 days.

(21) Appl. No.: 12/863,075

(22) PCT Filed: Jan. 19, 2009

(86) PCT No.: PCT/GB2009/000150
§ 371 (c)(1),
(2), (4) Date: Dec. 2, 2010

(87) PCT Pub. No.: WO2009/090416
PCT Pub. Date: Jul. 23, 2009

(65) Prior Publication Data
US 2011/0091636 A1 Apr. 21, 2011

(30) Foreign Application Priority Data

Jan. 19, 2008 (GB) .................................. 0800991.2

(51) Int. Cl.
*A23D 7/00* (2006.01)
*A23G 1/00* (2006.01)

(52) U.S. Cl.
USPC .............................. 426/631; 426/93; 426/602

(58) Field of Classification Search
USPC ........................................................ 426/631
See application file for complete search history.

(56) References Cited

U.S. PATENT DOCUMENTS

| 3,012,891 | A | * | 12/1961 | Lobley et al. | 426/607 |
|---|---|---|---|---|---|
| 5,554,408 | A | | 9/1996 | Cain et al. | |
| 6,146,672 | A | * | 11/2000 | Gonzalez et al. | 426/94 |
| 7,309,508 | B2 | * | 12/2007 | Bach et al. | 426/607 |
| 8,182,857 | B2 | * | 5/2012 | Cleenewerck et al. | 426/601 |
| 2008/0241335 | A1 | * | 10/2008 | Rey et al. | 426/575 |

FOREIGN PATENT DOCUMENTS

| EP | 0078568 | B1 | | 7/1985 |
|---|---|---|---|---|
| EP | 0276548 | | * | 8/1988 |
| EP | 0294974 | | * | 12/1988 |
| EP | 0547658 | | * | 2/1992 |
| EP | 0293194 | B1 | | 8/1992 |
| EP | 0547658 | | * | 6/1993 |
| EP | 1862077 | A1 | | 12/2007 |
| EP | 2030510 | A1 | | 3/2009 |
| WO | 2004017744 | A1 | | 3/2004 |
| WO | 2007025755 | A1 | | 3/2007 |
| WO | 2009029577 | A1 | | 3/2009 |

OTHER PUBLICATIONS

Wille, R. L. et al. JAOCS 43:491.*

(Continued)

*Primary Examiner* — Carolyn Paden
(74) *Attorney, Agent, or Firm* — Cantor Colburn LLP

(57) ABSTRACT

Aspects of the invention relate to a food emulsion, such as a water-in-oil emulsion. In some aspects the fat phase of the emulsion has a first fat and a second fat, where the melting point of the second fat is lower than that of the first fat. The first fat can exist in several crystal forms, but is present in the emulsion substantially in a single crystal form. The emulsion may be useful as a filling for confectionery compositions. Other aspects relate to confectionery compositions incorporating the emulsions, and to methods of making the emulsions.

33 Claims, 5 Drawing Sheets

OTHER PUBLICATIONS

International Search Report; International Application No. PCT/GB2009/000150; International Filing Date Jan. 19, 2009; Date of Mailing of International Search Report May 14, 2009; 3 pages.

Written Opinion of the International Searching Authority; International Application No. PCT/GB2009/000150; International Filing Date Jan. 19, 2009; 7 pages.

* cited by examiner

FOOD EMULSION

BACKGROUND OF THE INVENTION

The present invention relates to emulsions. In particular, it relates to emulsions for use in confectionery compositions.

It is known in the confectionery industry to use a variety of filling types within a shell or coating, the filling providing a contrasting taste, texture or mouthfeel with the material of the shell. For example, it is known to combine a chocolate shell with a filling of a chewy material such as caramel, a liquid such as an alcoholic liqueur, or a fat-based filling such as a truffle.

SUMMARY OF THE INVENTION

There is also a desire within the confectionery industry to produce low-calorie confectionery products, in order to meet the desire of consumers for products which are both enjoyable and healthy. It would therefore be desirable to produce a low-calorie material suitable for use in a confectionery composition, such as for example as a filling, in which the filling contributes to reducing the fat content and/or calories of the confectionery composition, which maintains an enjoyable texture, mouthfeel and flavor.

DETAILED DESCRIPTION OF THE INVENTION

Figure 1:
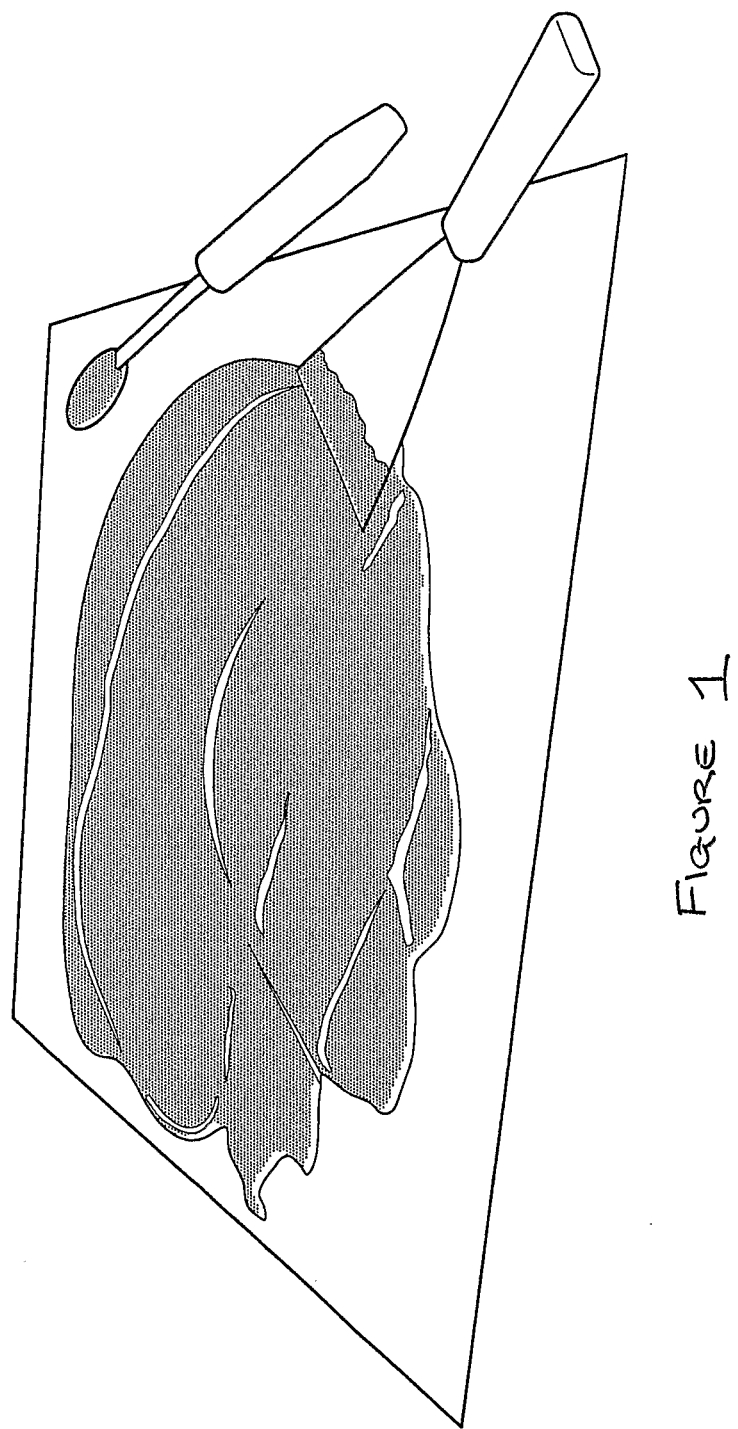
FIG. 1 shows the emulsion deposited on a marble slab.

According to a first aspect of the invention there is provided a confectionery emulsion comprising a fat phase; an emulsifier; and an aqueous phase; wherein the fat phase comprises a first fat that can exist in more than one crystal form, present substantially in a single crystal form having a first melting point; and a second fat having a second melting point lower than the first melting point.

In some embodiments, the first melting point is greater than 18° C.

In some embodiments, the first fat is selected from a tempering fat. Examples of tempering fats include cocoa butter and cocoa butter equivalents. Typically, cocoa butter equivalents are blends of vegetable fat such as palm oil mid-fraction, illipe butter, shea stearine and cocoa butter. Sal, mango, and/or kolum fats may also be used. One example of a cocoa butter equivalent is COBERINE™, available from Loders Croklaan B. V., Wormerveer, The Netherlands.

In some embodiments, the second fat is selected from a non-tempering fat. Examples of non-tempering fats include palm oil, palm kernel oil, butterfat, cocoa butter replacers and cocoa butter substitutes. Typically, cocoa butter replacers are hydrogenated, fractionated fat blends from soybean oil, rapeseed oil, palm oil, cottonseed oil, and/or sunflower oil, or other similar fats. Typically, cocoa butter substitutes are high lauric acid-containing fats, such as hydrogenated, fractionated fat blends from coconut and/or palm kernel oil, or other similar fats.

In some embodiments, the first (crystalline) fat may be cocoa butter (which can exist in at least six different crystal forms), and in particular the single crystal form may be the Form V (or $\beta_2$) crystal form. In some embodiments, the second fat may be non-crystalline, or may exist in the solid state in only a single crystal form (i.e. the second fat is non-temperable). In some embodiments, the second fat is palm oil.

In some embodiments, the ratio of the first fat to the second fat is between 3:1 and 1:3. In some further embodiments, the ratio is between 2:1 and 1:2.

In some embodiments, the first fat forms less than 20%, less than 15%, or less than 10% of the emulsion. In some embodiments, the first fat forms at least 1% or at least 5% of the emulsion.

In some embodiments, the fat phase forms less than 20% of the emulsion, or less than 15% of the emulsion. In some embodiments, the fat phase forms at least 10% of the emulsion. In some further embodiments, the fat phase forms from 12 to 14% of the emulsion.

The inventors have found that the incorporation of two separate fats, one a tempering fat, and one a non-tempering fat, into a low fat emulsion enables a confectionery emulsion to be manufactured that has an excellent texture and mouthfeel, similar to emulsions that have much higher fat contents.

In some embodiments, at least one of the fat phase and the aqueous phase further comprises a flavoring. In further embodiments, the confectionery emulsion further comprises a first flavoring in the fat phase and a second flavoring in the aqueous phase. In some embodiments, the first flavoring and the second flavoring provide different flavors.

In some embodiments, the emulsion has a savory flavor, a sweet flavor, a chocolate flavor, or a fruit flavor.

In some embodiments, the emulsion is sugar-free.

In some embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In such embodiments, the majority of the emulsion may be formed by the aqueous phase. In some embodiments, the aqueous phase may comprise a bulk sweetener. Examples of bulk sweeteners include sugars and sugar-free bulk sweeteners. In some embodiments, the bulk sweetener may comprise glucose syrup. Examples of glucose syrup include glucose syrup 63DE, corn syrup, high fructose corn syrup (HFCS) and mixtures thereof. In particular, the aqueous phase may consist of glucose syrup, optionally together with flavorings and/or colorings.

In some embodiments, the bulk sweetener may form at least 80% of the emulsion. In some embodiments, the bulk sweetener may form at least 85% or at least 90% of the emulsion. In some further embodiments, the bulk sweetener may form at least 95% of the emulsion.

It has surprisingly been found that a confectionery emulsion containing no more than 6% fat (and more surprisingly no more than 4% fat) in combination with a high proportion of bulk sweetener in the aqueous phase, confers excellent texture and mouthfeel characteristics for incorporation into confectionery products, whilst maintaining low fat characteristics and benefits.

In some embodiments, the fat phase forms less than 3% of the emulsion and the aqueous phase comprises glucose syrup 63DE, optionally together with one or more flavorings or colorings.

In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, the aqueous phase comprises polydextrose. In some embodiments, the polydextrose forms at least 70% of the emulsion or at least 75% of the emulsion. In some embodiments, the polydextrose forms at least 80%, or at least 83% of the emulsion. In some embodiments, the aqueous phase consists of polydextrose, optionally together with one or more flavorings and/or colorings.

In some embodiments, the aqueous phase comprises a gelling agent. In some embodiments, the gelling agent forms at least 1% of the emulsion, at least 1.5% of the emulsion, or at least 2% of the emulsion. In some embodiments, the gelling agent forms no more than 2.5% of the emulsion. In some embodiments, the gelling agent is gelatine.

In some embodiments, the emulsion further comprises a powdered component. In some further embodiments, the powdered component is distributed homogeneously throughout the fat phase. In some embodiments, the powdered component is selected from cocoa powder, milk powder and sugar, and mixtures of these. Examples of milk powder include skimmed milk powder. Examples of sugar include silk sugar and icing sugar. In some embodiments, the powdered component forms at least 2% of the emulsion, or at least 2.5% of the emulsion. In some embodiments, the powdered component forms less than 10%, less than 8% or less than 6% of the emulsion.

According to a second aspect of the invention, there is provided a confectionery composition comprising an emulsion according to the first aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate. In some further embodiments, the confectionery composition is a chocolate bar. In some alternative further embodiments, the confectionery composition is an individual single-serving chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to a third aspect of the invention there is provided a method of making a confectionery water-in-oil emulsion, comprising:

(a) blending a first fat having a first melting point, at a temperature above the first melting point, with a second fat having a second melting point lower than the first melting point, to form a fat phase;
(b) mixing an emulsifier with the fat phase;
(c) providing an aqueous phase;
(d) mixing the fat phase and aqueous phase to form an initial emulsion; and
(e) cooling the emulsion to a temperature lower than the first melting point but greater than or equal to the second melting point.

Without wishing to be bound by theory, it is believed that cooling of the first fat in the emulsion to below its melting point allows the fat crystals formed to stabilise the emulsion. One mechanism might involve the formation of a network of fat crystals around incorporated aqueous droplets, in a manner analogous to a Pickering emulsion. The selection of a temperature equal to or above the melting point of the second fat causes the second fat to remain liquid, allowing continued working or deposition of the emulsion, whilst the first fat is crystallised.

It will be understood that the first fat should generally be solid at a desired temperature. The second fat may be solid or liquid at that temperature, though in some embodiments it may be preferable for the second fat to be solid. The desired temperature may represent the preferred serving temperature. Alternatively, the desired temperature may represent the maximum temperature likely to be encountered during storage and transportation. For example, the desired temperature may be 20° C., 25° C. or 30° C.

In some embodiments, the first melting point is greater than 18° C.

In some embodiments, the first fat is a crystalline fat. In some embodiments, the first fat can exist in more than one crystal form and, subsequent to cooling the emulsion to a temperature lower than the first melting point but greater than or equal to the second melting point, the first fat may be present substantially in a single crystal form. In some further embodiments, cooling the emulsion to a temperature lower than the first melting point but greater than or equal to the second melting point may comprise causing the first fat to adopt preferentially a single crystal form. Alternatively or additionally, the method may further comprise processing the cooled emulsion to cause the first fat to adopt preferentially a single crystal form.

In some embodiments, the first fat is selected from a tempering fat. Examples of tempering fats include cocoa butter and cocoa butter equivalents. Typically, cocoa butter equivalents are blends of vegetable fat such as for example palm oil mid-fraction, illipe butter, shea stearine and cocoa butter. Sal, mango, and/or kolum fats may also be used. One example of a cocoa butter equivalent is COBERNE™, available from Loders Croklaan B. V., Wormerveer, The Netherlands.

In some embodiments, the second fat is selected from a non-tempering fat. Examples of non-tempering fat include palm oil, palm kernel oil, butterfat, cocoa butter replacers and cocoa butter substitutes. Typically, cocoa butter replacers are hydrogenated, fractionated fat blends from soybean oil, rapeseed oil, palm oil, cottonseed oil, and/or sunflower oil, or other similar fats. Typically, cocoa butter substitutes are high lauric acid-containing fats, such as for example hydrogenated, fractionated fat blends from coconut and/or palm kernel oil, or other similar fats.

In some embodiments, the first fat may be a tempering fat, and causing the first fat to adopt preferentially a single crystal form may comprise tempering the first fat. In particular, the first fat may be cocoa butter, and the method may comprise selective formation of the Form V (or $\beta_2$) crystal form of cocoa butter.

In some embodiments, the ratio of the first fat to the second fat is between 3:1 and 1:3. In some further embodiments, the ratio is between 2:1 and 1:2.

In some embodiments, the first fat forms less than 20%, less than 15%, or less than 10% of the emulsion. In some embodiments, the first fat forms at least 1% or at least 5% of the emulsion.

In some embodiments, the fat phase forms less than 20% of the emulsion, or less than 15% of the emulsion. In some embodiments, the fat phase forms at least 10% of the emulsion. In some further embodiments, the fat phase forms between 12 and 14% of the emulsion.

In some embodiments, cooling the emulsion comprises mechanically working the emulsion as it cools. In further embodiments, working the emulsion comprises working the emulsion on a slab, such as for example a marble slab.

In some embodiments, the first fat is a tempering fat. An example of a tempering fat is cocoa butter. In some embodiments, the second fat is a non-tempering fat. An example of a tempering fat is palm oil.

It will be understood that, in some embodiments, cooling the emulsion to a temperature lower than the first melting point but greater than or equal to the second melting point comprises a cessation of cooling (which may be temporary) when such a temperature is achieved. In some embodiments, the method further comprises processing of the emulsion at such a temperature. For example, upon cooling to a temperature lower than the first melting point but greater than or equal to the second melting point, the emulsion may be deposited into a confectionery shell, mixed with other confectionery ingredients, or processed in any other manner apparent to the skilled man.

In some embodiments, the emulsion comprises a flavoring. In some embodiments, providing an aqueous phase comprises providing an aqueous phase comprising a water-soluble flavoring. In some embodiments, the method further comprises mixing an oil-soluble flavoring with the fat phase. In some embodiments, both the phase and the fat phase each comprise a flavoring. In some further embodiments, the water-soluble flavoring and the fat-soluble flavoring are associated with different flavors.

In some embodiments, the fat phase forms less than 6% of the emulsion. In some further embodiments, the fat phase forms less than 5% or less than 4% of the emulsion. In some further embodiments, the fat phase forms less than 3.5% or less than 3% of the emulsion. In some embodiments, the fat phase forms at least 2% or at least 2.5% of the emulsion.

In some embodiments, providing an aqueous phase comprises providing an aqueous phase comprising a bulk sweetener. Examples of bulk sweetener include sugars and sugar-free bulk sweeteners. In some further embodiments, providing an aqueous phase comprises providing an aqueous phase comprising glucose syrup. In some further embodiments, providing an aqueous phase comprises providing an aqueous phase consisting of glucose syrup, optionally together with one or more flavorings and/or colorings.

In some embodiments, providing an aqueous phase comprises providing an aqueous phase comprising polydextrose solution. In some embodiments, the polydextrose solution forms at least 70% or at least 75% of the emulsion. In some further embodiments, the polydextrose forms at least 80% or at least 83% of the emulsion. In some embodiments, providing an aqueous phase comprises providing an aqueous phase consisting of polydextrose solution, optionally together with one or more flavorings and/or colorings.

In some embodiments, mixing an emulsifier with the fat phase comprises mixing more than one emulsifier with the fat phase. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, providing an aqueous phase comprises providing an aqueous phase comprising a gelling agent. In some embodiments, the gelling agent forms at least 1% of the emulsion or at least 1.5% of the emulsion. In some further embodiments, the gelling agent forms at least 2% of the emulsion. In some embodiments, the gelling agent forms no more than 2.5% of the emulsion. In some embodiments, the gelling agent is gelatine.

In some embodiments, the method further comprises adding a powdered component to the emulsion. It will be understood that the powdered component is added after mixing of the fat phase and aqueous phase to form an initial emulsion, and that the powdered composition does not (at least substantially) dissolve in the emulsion, but rather remains in solid form. In some embodiments, the powdered component is added before completion of cooling of the emulsion. In some embodiments, the powdered component is added before the emulsion has been cooled to a temperature below the first melting point. In some embodiments, the powdered component is selected from cocoa powder, milk powder and sugar, and mixtures of these. Examples of milk powder include skimmed milk powder. Examples of sugar include silk sugar and icing sugar. In some embodiments, the powdered component forms at least 2% of the emulsion, or at least 2.5% of the emulsion. In some embodiments, the powdered component forms less than 10%, less than 8% or less than 6% of the emulsion.

In some embodiments, mixing the aqueous and fat phase to form an emulsion comprises adding the aqueous phase to the fat phase in a mixer. Suitable mixers include planetary-action mixers available from Hobart UK, 51 The Bourne, Southgate, London N14 6RT, UK. Other mixing techniques will be readily apparent to the skilled man.

For example, emulsification may be achieved using a microfiltration apparatus such as that available from Micropore Technologies Ltd., The Innovation Centre, Epinal Way, Loughborough, Leicestershire LE11 3EH, UK. Alternatively, emulsification may be achieved in a high-shear mixer such as those available from Silverson Machines Ltd., Waterside, Chesham, Buckinghamshire HP5 1PQ, UK.

According to a fourth aspect of the invention there is provided a confectionery emulsion, producible according to the third aspect of the invention.

According to a fifth aspect of the present invention, there is provided a confectionery emulsion comprising a fat phase comprising at least a first flavoring and an aqueous phase comprising at least a second flavoring.

In some embodiments the first flavoring comprises a single flavor compound or agent or a mixture of two or more flavor compounds or agents. In some embodiments the second flavoring comprises a single flavor compound or agent or a mixture of two or more flavor compounds or agents. In some embodiments the first flavoring comprises at least one flavor compound or agent and the second flavoring comprises at least one flavor compound or agent different to those in the first flavoring. The first and second flavorings serve to confer different flavor profiles to the fat phase and aqueous phase, and the flavor profile of the aqueous phase is distinguishable from the flavor profile of the fat phase.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

As used herein, 'flavor profile' is intended to refer to the combination of flavors experienced by a consumer when the relevant phase is placed in the mouth. As used herein, 'distinguishable' is intended to mean that the two flavor profiles, when considered individually, can be distinguished by a typical consumer without specialist training.

Without wishing to be bound by theory, it is believed that the structure of the emulsion causes the components of the fat and aqueous phases to be released into the oral cavity (and hence for the flavor profiles associated with each of the phases to be detected by the consumer) at different rates. Thus, the overall flavor profile experienced by the consumer is expected to vary over the lifetime of the confectionery emulsion within the mouth, as the balance between the fat and aqueous phase flavor profiles shifts.

It will be understood that flavorings (and flavor compounds or agents) are typically either fat-soluble or water-soluble. Typically, fat-soluble flavorings will be incorporated in the fat phase, and/or water-soluble flavorings will be incorporated in the aqueous phase. In some embodiments, the fat phase comprises at least one fat-soluble flavoring and the aqueous phase comprises at least one water-soluble flavoring. In some embodiments, the fat-soluble flavoring and the water-soluble flavoring provide different flavors.

Without wishing to be bound by theory, it is believed that where at least one flavoring is incorporated within each the fat and aqueous phases, and the flavoring(s) in each phase are associated with different flavor profiles, it is to be expected that the ability of the consumer to distinguish the two flavor profiles will be enhanced. It will be understood that the ability for the flavor profiles to be distinguished will be further enhanced where there is a strong degree of contrast between the flavors. For example, a flavoring in one of the fat and aqueous phases may be associated with a sweet flavor (such as for example a sweet fruit flavor) whilst a flavoring in the other phase is associated with a sour flavor (such as for example a sour fruit flavor). In some embodiments, the fat phase may comprise a lime flavoring, and the aqueous phase may comprise a raspberry flavoring. Although one might expect that two similar fruit flavorings would be similar in flavor profile, the flavor profiles effected by incorporation of the flavorings in the fat and aqueous phases will be substantially different due to the different carrier media and the structure and phase release of the emulsion on consumption. In some embodiments, at least one of the fat and aqueous phases has a savory flavor, a sweet flavor, a chocolate flavor, or a fruit flavor.

It will be understood that emulsions comprise a discrete phase suspended in a continuous (or bulk) phase. In some embodiments, the continuous phase comprises a structuring agent. As used herein, 'structuring agent' is intended to refer to a component which has some degree of three-dimensional structure, such as for example a solid or a gel. In further embodiments, substantially less than all of the continuous phase is contained within the structure of the structuring agent. Typical structuring agents may include gelling materials (such as pectin and gelatine) in a continuous aqueous phase, and crystalline fats in a continuous fat phase.

It is believed that the presence of structure within the continuous phase contributes to the delay in release of flavor from the discrete phase, thereby accentuating the variation in flavor profile experienced by the consumer over the lifetime of the confectionery emulsion in the oral cavity.

In some embodiments, the confectionery emulsion of the present invention comprises a water-in-oil (W/O) emulsion.

In other words, the emulsion comprises discrete regions of aqueous phase material suspended in a continuous fat phase. In some embodiments, the fat phase comprises a first fat having a first melting point and a second fat having a second melting point lower than the first melting point. In some embodiments the first melting point is greater than 18° C.

The first and second fats may be selected so that, for example, the second fat is liquid at a serving temperature (such as room temperature), whilst the first fat is solid at the serving temperature. The liquid second fat enables the emulsion to flow (thereby allowing deposition of the emulsion within a confectionery product, for example), and may provide a creamy mouthfeel and texture to the consumer. The solid first fat acts as the structuring agent described above, retarding the release of flavor from the discrete aqueous phase.

In some embodiments, the first fat can exist in more than one crystal form and is present in the emulsion substantially in a single crystal form.

In particular, the first fat may melt slowly at the temperature of the oral cavity. An example of such a fat is cocoa butter. Melting of the first fat removes the ability to act as a structuring agent, allowing the gradual release of flavor from the discrete aqueous phase over the lifetime of the confectionery emulsion within the oral cavity.

In some embodiments, the second fat may comprise palm oil.

In some embodiments, the fat phase forms less than 20% of the emulsion, or less than 15% of the emulsion. In some embodiments, the fat phase forms at least 10% of the emulsion. In some further embodiments, the fat phase forms from 12 to 14% of the emulsion.

In some alternative embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In such embodiments, the majority of the emulsion may be formed by the aqueous phase. In some embodiments, the aqueous phase may comprise a bulk sweetener, such as for example a sugar or a sugar-free bulk sweetener. In some embodiments, the bulk sweetener may comprise glucose syrup. Examples of glucose syrup include glucose syrup 63DE, corn syrup, high fructose corn syrup (HFCS) and mixtures thereof. In particular, the aqueous phase may consist of glucose syrup, optionally together with flavorings and/or colorings.

According to a sixth aspect of the invention, there is provided a confectionery composition comprising an emulsion according to the fifth aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to the seventh aspect of the invention there is provided a method for making a confectionery emulsion according to the fifth aspect of the invention, comprising providing a first component for forming the continuous phase of the emulsion, placing the continuous phase in a mixer, and adding a second component for forming the discrete phase to the mixer whilst continually mixing.

Where the continuous phase comprises a structuring agent which forms a structure below a certain temperature (a 'structuring temperature'), mixing of the first and second components may take place at a temperature above the structuring temperature, and the method may additionally comprise cooling the emulsion to below the structuring temperature so that the structuring agent forms a structure. In particular, where the emulsion is a water-in-oil emulsion and the fat phase comprises cocoa butter, mixing of the fat component and the aqueous component may take place at a temperature greater than the melting point of cocoa butter, and the method may additionally comprise cooling the emulsion to a temperature below the melting point of cocoa butter.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, where the emulsion is a water-in-oil emulsion, the fat phase comprises a first fat having a first melting point and a second fat having a second melting point, and the first fat can exist in more than one crystal form, cooling the emulsion may comprise causing the first fat to adopt preferentially a single crystal form. In particular, where the first fat is cocoa butter, the method may comprise selective formation of the Form V (or $\beta_2$) crystal form of cocoa butter.

According to an eighth aspect of the invention, there is provided a confectionery water-in-oil emulsion comprising a fat phase and an aqueous phase, wherein the fat phase forms less than 6% of the emulsion.

In such embodiments, the majority of the emulsion may be formed by the aqueous phase. In some embodiments, the aqueous phase may comprise a bulk sweetener, such as for example a sugar or a sugar-free bulk sweetener. In some embodiments, the bulk sweetener may comprise glucose syrup. Examples of glucose syrup include glucose syrup 63DE, corn syrup, high fructose corn syrup (HFCS) and mixtures thereof. In particular, the aqueous phase may consist of glucose syrup, optionally together with flavorings and/or colorings.

In some embodiments, the bulk sweetener may form at least 80% of the emulsion. In some embodiments, the bulk sweetener may form at least 85% or at least 90% of the emulsion. In some further embodiments, the bulk sweetener may form at least 95% of the emulsion.

It has been surprisingly found that a confectionery emulsion containing no more than 6% fat (and more surprisingly no more than 4% fat) in combination with a high proportion of bulk sweetener in the aqueous phase, confers excellent texture and mouthfeel characteristics for incorporation into confectionery products, whilst maintaining low fat characteristics and benefits.

Without wishing to be bound by theory, it is believed that the selection of a fat content below 6% enables the provision of an emulsion which is suitable for replacing traditional emulsions but has superior health benefits through significantly reducing fat content. Such low fat contents have not previously been attained in the prior art with a significant degree of success, and it is believed that the superior value of this range has therefore not previously been recognised. In particular, it is believed that combination of the low fat content of the emulsion, together with the use of an aqueous phase such as glucose syrup, provides the emulsion with an unusual 'chewy' texture. The emulsion has physical properties which differ from known emulsions in the art, and from traditional confectionery made from glucose syrup.

In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In some embodiments, the fat phase may comprise a structuring agent. As used herein, 'structuring agent' is intended to refer to a component which has some degree of three-dimensional structure, such as for example a solid or a gel. In further embodiments, substantially less than all of the fat phase is contained within the structure of the structuring agent. Typical structuring agents include crystalline fats.

Without wishing to be bound by theory, it is believed that the presence of structure within the fat phase aids in stabilisation of the water-in-oil emulsion, despite the significant excess of aqueous phase over fat phase content.

In some embodiments, the fat phase comprises a first fat having a first melting point and a second fat having a second melting point lower than the first melting point. In some embodiments, the first melting point may be greater than 18° C. The first and second fats may be selected so that, for example, the second fat is liquid at a serving temperature (such as for example at room temperature), whilst the first fat is solid at the serving temperature. The liquid second fat enables the emulsion to flow (thereby allowing deposition of the emulsion within a confectionery product, for example), and may provide a creamy mouthfeel and texture to the consumer. The solid first fat acts as the structuring agent described above.

In some embodiments, the first fat may exist in more than one crystal form, and may be present in the emulsion in substantially a single crystal form. The first fat may be a tempering fat. Examples of tempering fats include cocoa butter (which can exist in at least six different crystal forms), and in particular the single crystal form may be the Form V (or $\beta_2$) crystal form of cocoa butter. The selection of a particular crystal form may contribute to the structural stabilisation effect described above, by providing a kinetic or thermodynamic barrier to disruption of the structure. The second fat may be a non-tempering fat. Examples of non-tempering fats include palm oil.

In some embodiments, the emulsion may comprise at least one flavoring. In some further embodiments, the fat phase may comprise a fat-soluble flavoring. Alternatively or additionally, the aqueous phase may comprise a water-soluble flavoring. The flavorings are as described hereinabove. In some embodiments, the emulsion may have a savory flavor, a sweet flavor, a chocolate flavor, or a fruit flavor.

According to a ninth aspect of the invention, there is provided a confectionery composition comprising an emulsion according to the eighth aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to the tenth aspect of the invention, there is provided a method for making a confectionery emulsion according to the eighth aspect of the invention, comprising melting a fat phase; mixing an emulsifier with the fat phase; providing an aqueous phase; adding the aqueous phase to the fat phase, to form an emulsion; and cooling until a desired temperature is reached.

In some embodiments the aqueous phase is added to the fat phase by mixing whilst gradually cooling the mixture.

In some embodiments, the fat phase comprises a first fat having a first melting point and a second fat having a second melting point lower than the first melting point, and cooling the emulsion until a desired temperature is reached comprises cooling the emulsion to a temperature between the first and second melting points.

In some further embodiments, the first fat may exist in more than one crystal form, and cooling the emulsion to a temperature between the first and second melting points may comprise causing the first fat to preferentially adopt a single crystal form.

According to an eleventh aspect of the invention, there is provided a water-in-oil emulsion comprising a fat phase and an aqueous phase, wherein the emulsion has a savory flavor.

In some embodiments, the emulsion is sugar-free.

In some embodiments, the aqueous phase comprises polydextrose solution. In further embodiments, the aqueous phase consists of polydextrose solution, optionally together with one or more colorings and/or flavorings. In some embodiments, the polydextrose solution forms at least 70% or at least 75% of the emulsion. In some further embodiments, the polydextrose solution forms at least 80% or at least 83% of the emulsion.

In some embodiments, the fat phase forms less than 20% of the emulsion or less than 15% of the emulsion. In some embodiments, the fat phase forms at least 10% of the emulsion. In some embodiments, the fat phase forms from 12 to 14% of the emulsion.

In some alternative embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In some embodiments, the fat phase may comprise a structuring agent. As used herein, 'structuring agent' is intended to refer to a component which has some degree of three-dimensional structure, such as for example a solid or a gel. In further embodiments, substantially less than all of the fat phase is contained within the structure of the structuring agent. Typical structuring agents include crystalline fats.

Without wishing to be bound by theory, it is believed that the presence of structure within the fat phase aids in stabilisation of the water-in-oil emulsion, despite the significant excess of aqueous phase over fat phase content.

In some embodiments, the fat phase comprises a first fat having a first melting point and a second fat having a second melting point lower than the first melting point. In some embodiments, the first melting point may be greater than 18° C. The first and second fats may be selected so that, for example, the second fat is liquid at a serving temperature (such as for example at room temperature), whilst the first fat is solid at the serving temperature. The liquid second fat enables the emulsion to flow (thereby allowing deposition of the emulsion within a product, for example), and may provide a creamy mouthfeel and texture to the consumer. The solid first fat acts as the structuring agent described above.

In some embodiments, the first fat may exist in more than one crystal form, and may be present in the emulsion in substantially a single crystal form. The first fat may be a tempering fat. Examples of tempering fats include cocoa butter (which can exist in at least six different crystal forms), and in particular the single crystal form may be the Form V (or $\beta_2$) crystal form of cocoa butter. The selection of a particular crystal form may contribute to the structural stabilisation effect described above, by providing a kinetic or thermodynamic barrier to disruption of the structure. In some embodiments, the second fat may be a non-tempering fat. Examples of non-tempering fats include palm oil.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, the emulsion comprises one or more flavorings. The flavorings may be associated individually with sweet, sour, salty, savory or umami flavors, provided that the flavor profile of the emulsion as a whole is savory. In some embodiments, the emulsion comprises one or more savory flavorings.

According to a twelfth aspect of the invention, there is provided a confectionery composition comprising an emulsion according to the eleventh aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to a thirteenth aspect of the invention, there is provided a method for making a water-in-oil emulsion according to the eleventh aspect of the invention, comprising melting a fat phase; mixing an emulsifier with the fat phase; providing an aqueous phase; adding the aqueous phase to the fat phase with mixing to form an emulsion; and cooling until a desired temperature is reached.

In some embodiments the aqueous phase is added to the fat phase by mixing whilst gradually cooling the mixture.

In some embodiments, the fat phase comprises a first fat having a first melting point and a second fat having a second melting point lower than the first melting point, and cooling the emulsion until a desired temperature is reached comprised cooling the emulsion to a temperature between the first and second melting points.

In some further embodiments, the first fat may exist in more than one crystal form, and cooling the emulsion to a temperature between the first and second melting points may comprise causing the first fat to preferentially adopt a single crystal form.

According to a fourteenth aspect of the invention, there is provided a confectionery water-in-oil emulsion comprising a fat phase and an aqueous phase wherein the emulsion is at least substantially sugar-free.

As used herein, 'substantially sugar-free' is intended to mean that the emulsion is substantially free from sugar, and hence that substantially all the sweetening effect (if any) is provided by a sugar-free sweetener. In some embodiments, the emulsion may comprise no more than trace quantities of sugar.

In some embodiments, the aqueous phase comprises a sugar free sweetener. In some further embodiments, the sugar-free sweetener comprises one or more sugar alcohols and/or polydextrose. In some embodiments, the aqueous phase consists substantially of a solution of one or more sugar-free sweeteners, optionally together with flavorings and/or colorings. In some embodiments, the sugar-free sweetener forms at least 70%, at least 75% or at least 80% of the emulsion.

In some embodiments, the fat phase forms less than 20% or less than 15% of the emulsion. In some embodiments, the fat phase forms at least 10% of the emulsion. In some further embodiments, the fat phase forms from 12 to 14% of the emulsion.

In some alternative embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In some embodiments, the fat phase may comprise a structuring agent. As used herein, 'structuring agent' is intended to refer to a component which has some degree of three-dimensional structure, such as for example a solid or a gel. In further embodiments, substantially less than all of the fat phase is contained within the structure of the structuring agent. Typical structuring agents include crystalline fats.

Without wishing to be bound by theory, it is believed that the presence of structure within the fat phase aids in stabilisation of the water-in-oil emulsion, despite the significant excess of aqueous phase over fat phase content.

In some embodiments, the fat phase comprises a first fat having a first melting point and a second fat having a second melting point lower than the first melting point. In some embodiments, the first melting point may be greater than 18° C. The first and second fats may be selected so that, for example, the second fat is liquid at a serving temperature (such as for example at room temperature), whilst the first fat is solid at the serving temperature. The liquid second fat enables the emulsion to flow (thereby allowing deposition of the emulsion within a product, for example), and may provide a creamy mouthfeel and texture to the consumer. The solid first fat acts as the structuring agent described above.

In some embodiments, the first fat may exist in more than one crystal form, and may be present in the emulsion in substantially a single crystal form. The first fat may be a tempering fat. Examples of tempering fats include cocoa butter (which can exist in at least six different crystal forms), and in particular the single crystal form may be the Form V (or $\beta_2$) crystal form of cocoa butter. The selection of a particular crystal form may contribute to the structural stabilisation effect described above, by providing a kinetic or thermodynamic barrier to disruption of the structure. The second fat may be a non-tempering fat. Examples of non-tempering fats include palm oil.

In some embodiments, the aqueous phase comprises polydextrose solution. In further embodiments, the aqueous phase consists of polydextrose solution, optionally together with one or more colorings and/or flavorings. In some embodiments, the polydextrose forms at least 70% or at least 75% of the emulsion. In some further embodiments, the polydextrose forms at least 80% or at least 83% of the emulsion.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, the emulsion further comprises suspended solid particles. In some further embodiments, the suspended solid particles comprise cocoa powder particles.

In some embodiments, the emulsion has a savory flavor, a sweet flavor, a chocolate flavor, or a fruit flavor.

According to a fifteenth aspect of the invention, there is provided a confectionery composition comprising an emulsion according to the fourteenth aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to a sixteenth aspect of the invention, there is provided a method for making a confectionery water-in-oil emulsion according to the fourteenth aspect of the invention, comprising melting a fat phase; mixing an emulsifier with the fat phase; providing an aqueous phase; adding the aqueous phase to the fat phase to form an emulsion; and cooling until a desired temperature is reached.

In some embodiments the aqueous phase is added to the fat phase by mixing whilst gradually cooling the mixture.

In some embodiments, the fat phase comprises a first fat having a first melting point and a second fat having a second melting point lower than the first melting point, and cooling the emulsion until a desired temperature is reached comprised cooling the emulsion to a temperature between the first and second melting points.

In some further embodiments, the first fat may exist in more than one crystal form, and cooling the emulsion to a temperature between the first and second melting points may comprise causing the first fat to preferentially adopt a single crystal form.

In some embodiments, the method further comprises adding solid particles to the emulsion during cooling of the emulsion. In some further embodiments, the solid particles comprise cocoa powder.

According to a seventeenth aspect of the present invention, there is provided a confectionery water-in-oil emulsion comprising a fat phase and an aqueous phase, wherein the fat phase comprises a first fat having a first melting point and a second fat having a second melting point lower than the first melting point; and the aqueous phase comprises a flavoring.

The flavoring is as hereinabove described.

In some embodiments, the fat phase may comprise a structuring agent. As used herein, 'structuring agent' is intended to refer to a component which has some degree of three-dimensional structure, such as for example as a solid or a gel. In further embodiments, substantially less than all of the fat phase is contained within the structure of the structuring agent. Typical structuring agents include crystalline fats.

Without wishing to be bound by theory, it is believed that the presence of structure within the fat phase aids in stabilisation of the water-in-oil emulsion.

In some embodiments, the first melting point may be greater than 18° C. The first and second fats may be selected so that, for example, the second fat is liquid at a serving temperature (such as for example at room temperature), whilst the first fat is solid at the serving temperature. The liquid second fat enables the emulsion to flow (thereby allowing deposition of the emulsion within a confectionery product, for example), and may provide a creamy mouthfeel and texture to the consumer. The solid first fat acts as the structuring agent described above.

In some embodiments, the first fat can exist in more than one crystal form, and may be present in the emulsion in substantially a single crystal form. The first fat may be a tempering fat. Examples of tempering fats include cocoa butter (which can exist in at least six different crystal forms), and in particular the single crystal form may be the Form V (or $\beta_2$) crystal form of cocoa butter. The selection of a particular crystal form may contribute to the structural stabilisation effect described above, by providing a kinetic or thermodynamic barrier to disruption of the structure. The second fat may be a non-tempering fat. Examples of non-tempering fats include palm oil.

In some embodiments, the fat phase forms no more than 20% of the emulsion or no more than 15% of the emulsion. In some embodiments, the fat phase forms at least 10% of the emulsion. In some embodiments, the fat phase forms from 12 to 14% of the emulsion.

In some alternative embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In some embodiments, the aqueous phase comprises a bulk sweetener solution. In some embodiments, the bulk sweetener comprises glucose syrup. In some further embodiments, the bulk sweetener comprises glucose syrup 63DE.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

According to an eighteenth aspect of the invention, there is provided a confectionery composition comprising an emulsion according to the seventeenth aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to a nineteenth aspect of the invention, there is provided a method for making a confectionery water-in-oil emulsion according to the seventeenth aspect of the invention, comprising melting a fat phase; mixing an emulsifier with the fat phase; providing an aqueous phase comprising a water-soluble flavoring; adding the aqueous phase to the fat phase with mixing to form an emulsion; and cooling until a desired temperature is reached.

In some embodiments the aqueous phase is added to the fat phase by mixing whilst gradually cooling the mixture.

In some embodiments, the fat phase comprises a first fat having a first melting point and a second fat having a second melting point lower than the first melting point, and cooling the emulsion until a desired temperature is reached comprised cooling the emulsion to a temperature between the first and second melting points.

In some further embodiments, the first fat may exist in more than one crystal form, and cooling the emulsion to a temperature between the first and second melting points may comprise causing the first fat to preferentially adopt a single crystal form.

In some embodiments, mixing the aqueous and fat phase to form an emulsion comprises adding the aqueous phase to the fat phase in a mixer. Suitable mixers include planetary-action mixers available from Hobart UK, 51 The Bourne, Southgate, London N14 6RT. Other mixing techniques will be readily apparent to the skilled man.

According to a twentieth aspect of the invention, there is provided a water-in-oil emulsion comprising a fat phase, an aqueous phase, and a powdered component; wherein the fat phase comprises a first fat having a first melting point and a second fat having a second melting point lower than the first melting point; and the powdered component is distributed homogeneously throughout the emulsion.

In some embodiments, the fat phase may comprise a structuring agent. As used herein, 'structuring agent' is intended to refer to a component which has some degree of three-dimensional structure, such as for example a solid or a gel. In further embodiments, substantially less than all of the fat phase is contained within the structure of the structuring agent. Typical structuring agents include crystalline fats.

Without wishing to be bound by theory, it is believed that the presence of the powdered component throughout the emulsion provides some slight disruption of the stabilising structure created by the fat phase. This results in the emulsion having an improved texture, and provides better release of flavor from the emulsion into the oral cavity on consumption.

In some embodiments the powder is distributed substantially homogeneously throughout the fat phase.

In some embodiments, the emulsion is a confectionery emulsion.

In some embodiments, the first melting point may be greater than 18° C. The first and second fats may be selected so that, for example, the second fat is liquid at a serving temperature (such as for example at room temperature), whilst the first fat is solid at the serving temperature. The liquid second fat enables the emulsion to flow (thereby allowing deposition of the emulsion within a confectionery product, for example), and may provide a creamy mouthfeel and texture to the consumer. The solid first fat acts as the structuring agent described above.

In some embodiments, the first fat can exist in more than one crystal form, and may be present in the emulsion in substantially a single crystal form. The first fat may be a tempering fat. Examples of tempering fats include cocoa butter (which can exist in at least six different crystal forms), and in particular the single crystal form may be the Form V (or $\beta_2$) crystal form of cocoa butter. The selection of a particular crystal form may contribute to the structural stabilisation effect described above, by providing a kinetic or thermodynamic barrier to disruption of the structure. The second fat may be a non-tempering fat. Examples of non-tempering fats include palm oil.

In some embodiments, the fat phase forms no more than 20% of the emulsion or no more than 15% of the emulsion. In some embodiments, the fat phase forms at least 10% of the emulsion. In some embodiments, the fat phase forms from 11.5 to 14% of the emulsion.

In some alternative embodiments, the fat phase forms less than 6% of the emulsion. In some embodiments, the fat phase forms less than 5% of the emulsion, less than 4% of the emulsion, less than 3.5% or less than 3% of the emulsion. In some embodiments, the fat phase forms at least 2% or at least 2.5% of the emulsion.

In some embodiments, the powdered component is selected from cocoa powder, milk powder and sugar, and mixtures of these. Examples of milk powder include skimmed milk powder. Examples of sugar include silk sugar and icing sugar.

In some embodiments, the powdered component forms at least 2% of the emulsion, or at least 2.5% of the emulsion. In some embodiments, the powdered component forms less than 10%, less than 8% or less than 6% of the emulsion.

In some embodiments, the emulsion further comprises an emulsifier. In some embodiments, the emulsion comprises more than one emulsifier. In some embodiments, the total emulsifier content forms less than 2.5%, less than 2% or less than 1.5% of the emulsion. In some embodiments, the emulsion comprises a mixture of polyglycerol polyricinoleate (PGPR) and mono- and diglycerides as emulsifier.

In some embodiments, the aqueous phase comprises a bulk sweetener solution. In some embodiments, the bulk sweetener comprises glucose syrup.

According to a twenty-first aspect of the invention, there is provided a confectionery composition comprising an emulsion according to the twentieth aspect of the invention.

In some embodiments, the confectionery composition is a chocolate composition. In some further embodiments, the confectionery composition further comprises milk, white, or plain chocolate. In some further embodiments, the confectionery composition comprises an outer layer of chocolate.

In some alternative embodiments, the confectionery composition is a chewing gum composition. In some alternative embodiments, the confectionery composition is a candy composition.

In some embodiments, the emulsion may be incorporated within the confectionery composition as a discrete region, such as for example as a filling. In alternative embodiments, the emulsion may be mixed with other ingredients, and/or distributed homogeneously throughout the confectionery composition.

In some embodiments the confectionery composition comprises an outer chocolate shell or coating and an inner filling comprising the emulsion. In some further embodiments, the inner filling consists substantially of the emulsion.

According to a twenty-second aspect of the invention, there is provided a method for making a water-in-oil emulsion according to the twentieth aspect of the invention, comprising melting a fat phase; mixing an emulsifier with the fat phase; providing an aqueous phase comprising a water-soluble flavoring; adding the aqueous phase to the fat phase to form an emulsion; adding a powdered component to the formed emulsion.

In some embodiments the method further comprises continuing to mix the emulsion after powder addition whilst cooling until a desired temperature is reached.

It will be understood that the powdered component is added after mixing of the fat phase and aqueous phase to form an initial emulsion. This enables the powdered component to be distributed homogeneously throughout the fat phase, in contrast to prior art approaches in which the powdered component was pre-mixed with the aqueous phase. The addition of the powder after emulsion formation is believed to slightly disrupt the structure of the emulsion which then confers excellent mouthfeel and handling characteristics for incorporation into a confectionery product.

In some embodiments, the powdered component is added before completion of cooling of the emulsion. In some embodiments, the powdered component is added before the emulsion has been cooled to a temperature below the first melting point. In some embodiments (in particular where the fat phase comprises or consists substantially of cocoa butter and palm oil) the powdered component is added when the temperature of the emulsion is approximately 30° C. At this temperature, it has been found that the emulsion is still soft enough to allow homogeneous distribution of the powdered component, yet has stabilised sufficiently (through cooling) to retain its structure during incorporation of the powdered component.

In some embodiments, the powdered component is selected from cocoa powder, milk powder and sugar, and mixtures of these. Examples of milk powder include skimmed milk powder. Examples of sugar include silk sugar and icing sugar.

In some embodiments, the powdered component forms at least 2% of the emulsion, or at least 2.5% of the emulsion. In some embodiments, the powdered component forms less than 10%, less than 8% or less than 6% of the emulsion.

In some embodiments, the fat phase comprises a first fat having a first melting point and a second fat having a second melting point lower than the first melting point, and cooling the emulsion until a desired temperature is reached comprised cooling the emulsion to a temperature between the first and second melting points.

In some further embodiments, the first fat may exist in more than one crystal form, and cooling the emulsion to a temperature between the first and second melting points may comprise causing the first fat to preferentially adopt a single crystal form.

In some embodiments, mixing the aqueous and fat phase to form an emulsion comprises adding the aqueous phase to the fat phase in a mixer. Suitable mixers include planetary-action mixers available from Hobart UK, 51 The Bourne, Southgate, London N14 6RT. Other mixing techniques will be readily apparent to the skilled man.

The following comments are applicable to all aspects and embodiments of the invention described hereinabove.

All references to percentages of ingredients refer to percentages by weight.

In some embodiments, the emulsion comprises a water-in-oil (W/O) emulsion. Such an emulsion may be, for example, a water-in-oil (W/O) emulsion, an oil-in-water-in-oil (O/W/O) emulsion, or a water-in-oil-in-water (W/O/W) emulsion. In the case of an oil-in-water-in-oil (O/W/O) emulsion, references to an aqueous phase will be understood to include the oil-in-water (O/W) phase, and references to the fat phase will be understood to refer to the bulk fat phase. In the case of a water-in-oil-in-water emulsion, references to the aqueous phase will be understood to refer to the discrete (innermost) water phase.

In some embodiments, the aqueous phase comprises a bulk sweetener. In some embodiments, the bulk sweetener may comprise a sugar and/or a sugar-free bulk sweetener. In some embodiments, the emulsion is a low-calorie emulsion. In some embodiments, the emulsion is substantially free from sugar.

As used herein, the term 'bulk sweetener' has the standard meaning in the art, being used to refer to a sweetener having a sweetness approximately comparable to that of sucrose (such as sucrose itself, or alternative sweeteners which may be added as a direct replacement of sucrose in a recipe). As used herein, the term 'sugar-free bulk sweetener' has the standard meaning in the art, being used to refer to a bulk sweetener which has a low or substantially no calorific value. Typical sugar-free bulk sweeteners include sugar alcohols such as for example sorbitol, erythritol, mannitol, xylitol, lactitol, maltitol and hydrogenated isomaltulose; polydextrose; and mixtures of these.

The aqueous phase may comprise other ingredients as appropriate. For example, the aqueous phase may include preservatives, fibres (such as for example inulin), gelling agents (such as for example carrageenan, agar, starch or gelatine), flavorings (including food acids) and/or colorings.

Suitable preservatives include acetic acid, benzoic acid, sorbic acid, propionic acid, sodium or potassium salts of these acids, and sodium and potassium nitrites and sulfites.

Suitable flavorings include those known in the art. Examples of such flavorings include those associated with sweet and savory flavors. Examples of sweet flavors include fruit flavors such as for example apple, apricot, banana, blackcurrant, blueberry, cherry, coconut, cola, cranberry, grape, grapefruit, guava, lemon, lime, mango, orange, passion fruit, peach, pineapple, pomegranate, raspberry, rhubarb, strawberry, vanilla, and watermelon; confectionery flavors such as for example butterscotch, caramel, chocolate, candyfloss (cotton candy), and toffee; nut flavors such as for example almond, and hazelnut; and other flavors such as for example cinnamon, ginger, malt, and honey. Examples of savory flavors include meat flavors such as for example barbecue, beef, chicken, gammon, lamb, and pork; and herbal flavors such as for example cardamom, chilli, coriander, fennel, garlic, onion, pepper, potato, sweetcorn, and tomato.

The emulsifier used in aspects of the present invention may be any suitable emulsifier having an LB (hydrophilic-lipophilic balance) value below 7. Suitable emulsifiers include those approved for use in chocolate and known to the skilled man. Examples of suitable emulsifiers include lecithins; alginic acid; sodium alginate; potassium alginate; ammonium alginate; calcium alginate; propan-1,2-diol alginate; agar; carrageenan; locust bean gum; guar gum; tragacanth; gum arabic; xanthan gum; glycerol; polysorbate 20 (sold commercially as TWEEN 20); polysorbate 80 (TWEEN 80); polysorbate 40 (TWEEN 40); polysorbate 60 (TWEEN 60); polysorbate 65 (TWEEN 65); pectin; amidated pectin; ammonium phosphatides; methylcellulose; hydroxypropylcellulose; hydroxypropylmethylcellulose; ethylmethylcellulose; sodium, potassium and calcium salts of fatty acids; glyceryl monostearate; acetic acid esters; lactic acid esters; citric acid esters; tartaric acid esters; mono and diacetyltartaric acid esters; sucrose esters of fatty acids; sucroglycerides; polyglycerol esters of fatty acids; polyglycerol polyricinoleate; propan-1,2-diol esters of fatty acids; sodium stearoyl-2-lactate; calcium stearoyl-2-lactate; sorbitan monostearate; sorbitan tristearate; sorbitan monolaurate; sorbitan monooleate; sorbitan monopalmitate; and other mono- or diglycerides.

As used herein, the term 'tempering fat' has the standard meaning in the art, being used to refer to a fat having more than one crystal form having different thermodynamic or kinetic stabilities. As used herein, the term 'tempering' (when used as a verb) has the standard meaning in the art, being used to refer to a process whereby a tempering fat is preferentially crystallised into one of its crystal forms.

Figure 2:
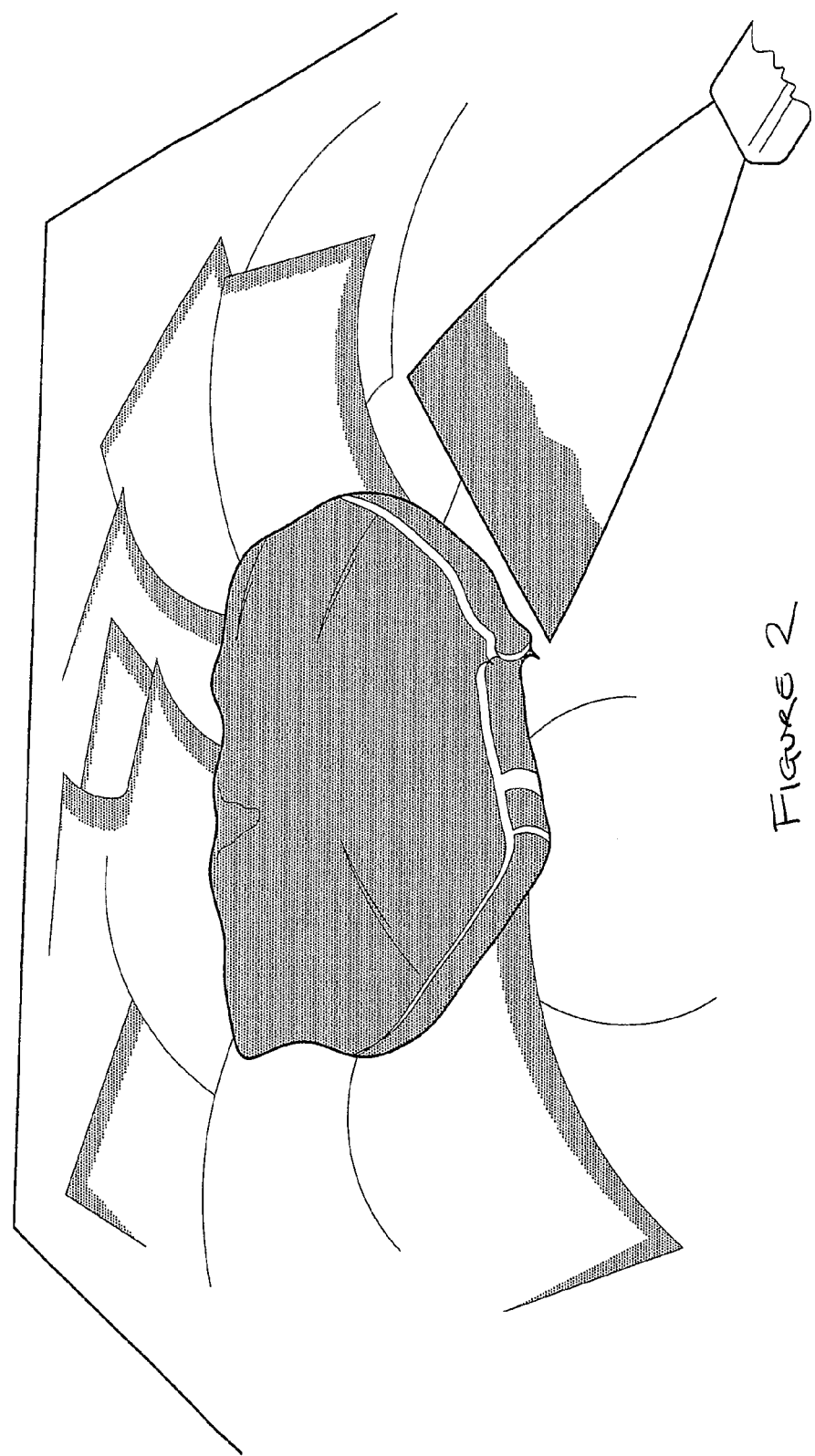
FIG. 2 shows the emulsion of FIG. 1 following mechanical working.
Figure 3:
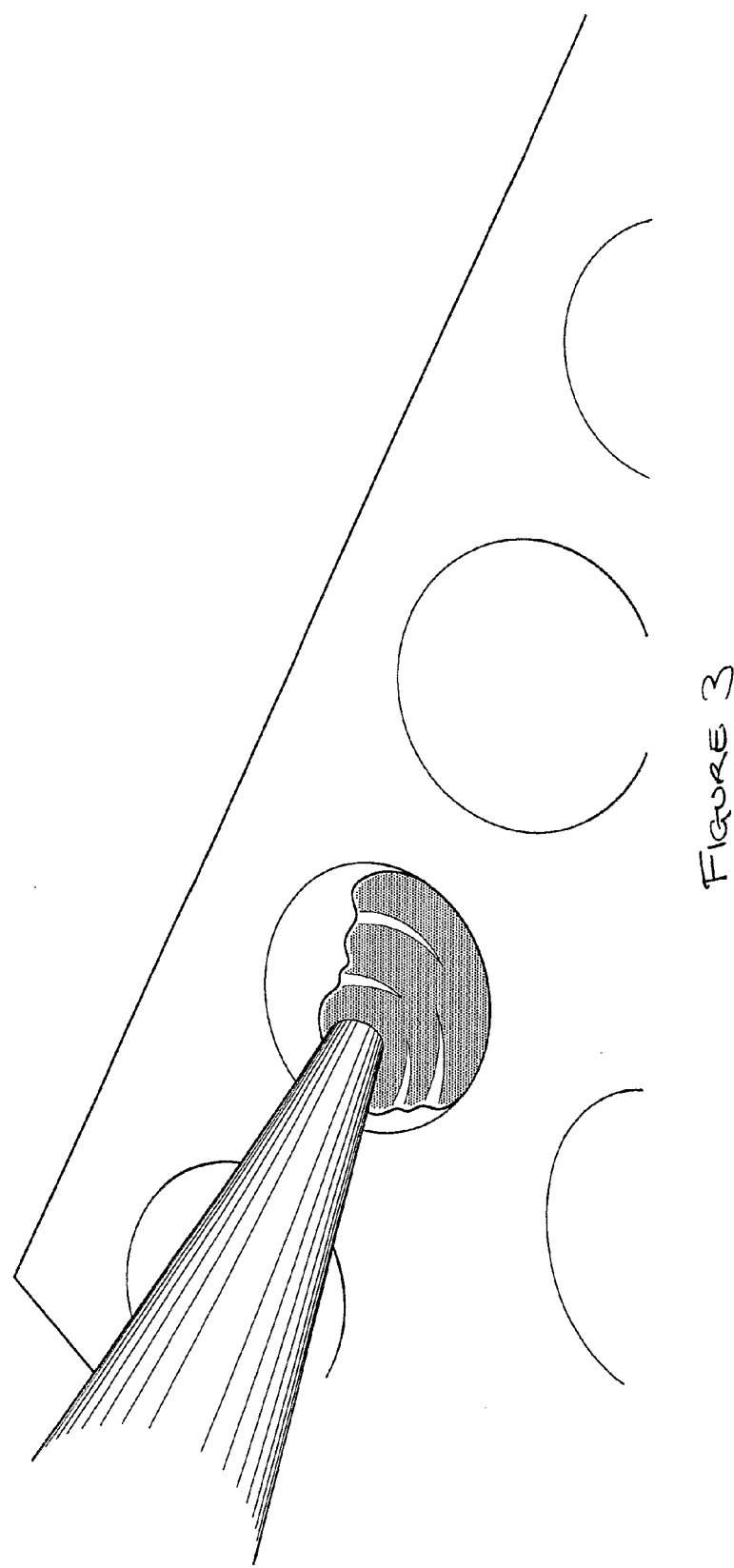
FIG. 3 shows the emulsion of FIG. 2 being piped into chocolate shells.
Figure 4:
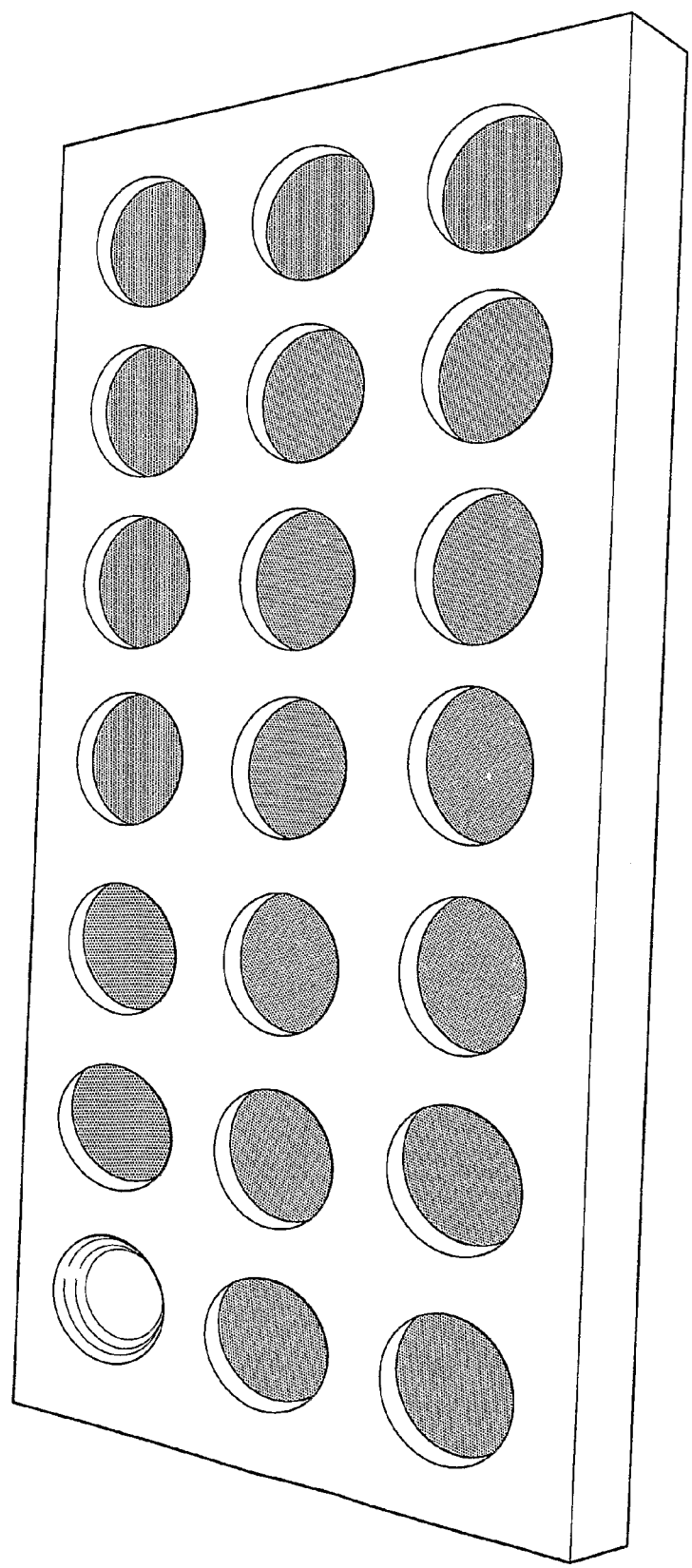
FIG. 4 shows a mould tray with mould cavities containing the chocolate emulsion of the claims.
Figure 5:
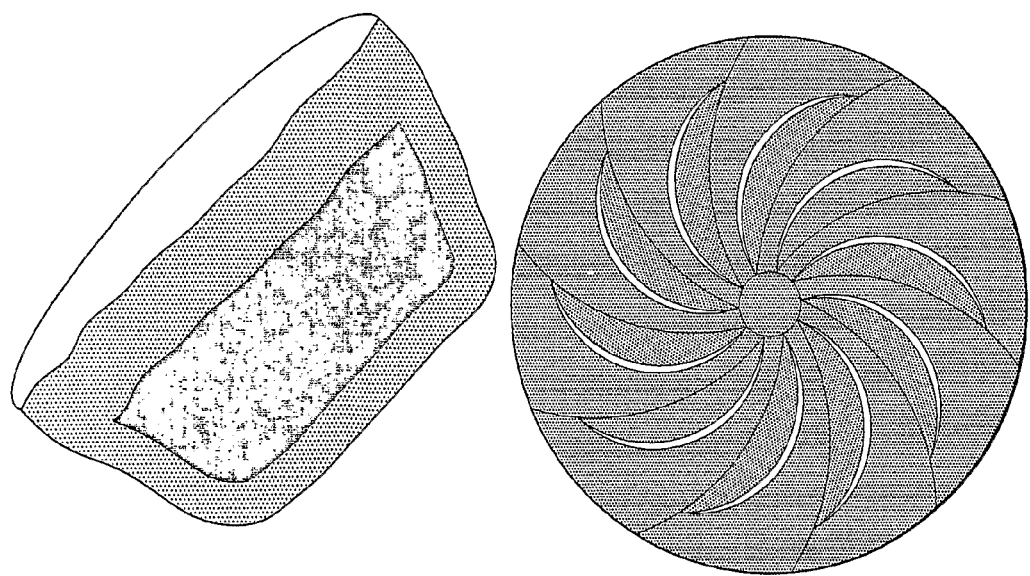
FIG. 5 shows finished chocolate confections with filling formed from the emulsion of FIG. 2.

Embodiment of aspects of the present invention will now be described by way of example. Reference is made to the accompanying Figures, in which:

FIG. 1 shows an emulsion according to at least the first aspect of the invention deposited on a marble slab for working;

FIG. 2 shows the emulsion of FIG. 1 following mechanical working on the marble slab;

FIG. 3 shows the emulsion of FIG. 2 being piped into chocolate shells within a cavity in a mould tray;

FIG. 4 shows a mould tray with the mould cavities each containing a chocolate shell containing the set emulsion of FIG. 2; and FIG. 5 shows finished chocolate confections with a filling formed from the emulsion of FIG. 2.

EXAMPLE 1

An emulsion according to at least the first and fourteenth aspects was prepared according to the following process. Molten cocoa butter (280 g) and palm oil (420 g) were blended together. Citric acid ester emulsifier (available commercially as PALSGAARD 4201-IP00420101 citric acid ester) was then added to the blended oils. The mixture was heated to 80° C. and then stored at 40° C. to prevent re-solidification of the fats. Separately, maltitol syrup (700 g, 80% dry solids, commercially available as LYCASIN from Roquette Frères 62080 Lestrem, France) was diluted with water (200 ml). The blended oils were then placed in a container under the head of a Silverson high-shear mixer and mixed at 3500 rpm. The maltitol solution was added slowly and mixed until no more separation was visible.

1 kg of the emulsion was then weighed out and transferred to a marble slab, as shown in FIG. 1. The emulsion was worked with metal scrapers until it achieved a consistency similar to that of custard, as shown in FIG. 2 (i.e. it remained fluid, but did not flow except under pressure), ensuring that the temperature did not fall below 18° C. The emulsion was then transferred into a piping bag and piped into preformed chocolate moulds, as shown in FIG. 3. The filled moulds were chilled at 4° C. for a few minutes to set the emulsion, as shown in FIG. 4, and were then backed with tempered chocolate in the normal manner to form chocolate confections filled with the emulsion, as shown in FIG. 5.

EXAMPLE 2

An emulsion according to at least the first and fourteenth aspects was prepared according to the following process. The procedure of Example 1 was repeated, with the exception that emulsion formation took place in a Micropore rig. The blended oil phase was passed through the centre of the rig with the main pump miming, whilst the maltitol solution was fed into the oil phase using the small pump, the maltitol solution being separated from the oil phase by a microporous membrane. Uniform small droplets of aqueous phase material were therefore drawn through the membrane and incorporated into the resulting emulsion. This was continued until all the maltitol solution had been fed in. The emulsion was then worked and piped into moulds as described for Example 1.

EXAMPLE 3

An emulsion according to at least the first and fourteenth aspects was prepared according to the following process. The procedure of Example 1 was repeated with the addition of 125 g of cocoa powder to 1 kg of the worked emulsion to form a chocolate composition.

EXAMPLE 4

An emulsion according to at least the first aspect was prepared according to the following process. 80 g of palm oil and 50 g of non-deodorised cocoa butter were melted and mixed. 5.0 g of polyglycerol polyricinoleate and 5.0 g of distilled monoglyceride were added to the fat mixture with stirring, and the resultant mixture heated to 45° C. 590 g of high maltose syrup and 256 g of glucose fructose syrup were separately mixed together and heated to 45° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. The mixture was mixed for a further 10 minutes, during which time the temperature of the mixture decreased to 33° C. 14.0 g of sieved milled cocoa powder was then added gradually with continuous mixing. Once all the cocoa powder had been added, water from a water bath at 20° C. was circulated through the jacket of the mixer bowl, and mixing of the product continued until the temperature reached 27° C. or the product gained opacity. At this point the mixer and water circulation were stopped, and the mixture was stirred with a spoon, and then placed into sterile containers or deposited into chocolate shells.

EXAMPLE 5

An emulsion according to at least the first aspect was prepared according to the following process. 130 g of CHOCOFILL NH18™ vegetable fat blend was melted and 5.0 g of polyglycerol polyricinoleate and 5.0 g of distilled monoglyceride were added with stirring, and the resultant mixture heated to 45° C. 640 g of high maltose syrup and 206 g of glucose fructose syrup were separately mixed together and heated to 45° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. The mixture was mixed for a further 10 minutes, during which time the temperature of the mixture decreased to 33° C. 14.0 g of sieved milled cocoa powder was then added gradually with continuous mixing. Once all the cocoa powder had been added, water from a water bath at 20° C. was circulated through the jacket of the mixer bowl, and mixing of the product continued until the temperature reached 27° C. or the product gained opacity. At this point the mixer and water circulation were stopped, and the mixture was stirred with a spoon, and then placed into sterile containers or deposited into chocolate shells.

EXAMPLE 6

An emulsion according to at least the first aspect was prepared according to the following process. 65 g of palm oil and 65 g of SILKO CO 50™ cocoa butter substitute were melted and mixed. 5.0 g of polyglycerol polyricinoleate and 5.0 g of distilled monoglyceride were added to the fat mixture with stirring, and the resultant mixture heated to 45° C. 640 g of high maltose syrup and 206 g of glucose fructose syrup were separately mixed together and heated to 45° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. The mixture was mixed for a further 10 minutes, during which time the temperature of the mixture decreased to 33° C. 14.0 g of sieved milled cocoa powder was then added gradually with continuous mixing. Once all the cocoa powder had been added, water from a water bath at 20° C. was circulated through the jacket of the mixer bowl, and mixing of the product continued until the temperature reached 27° C. or the product gained opacity. At this point the mixer and water circulation were stopped, and the mixture was stirred with a spoon, and then placed into sterile containers or deposited into chocolate shells.

EXAMPLE 7

An emulsion according to at least the first, fifth and seventeenth aspects was prepared according to the following process. 25 g of palm oil and 40 g of cocoa butter were melted and mixed. 2.5 g of PALSGAARD 4150™ polyglycerol polyricinoleate and 2.5 g of PALSGAARD 0298™ distilled monoglyceride and 0.125 g of oil-soluble lime flavor were added to the fat mixture with stirring, and the resultant mixture heated to 45° C. 254 g of high maltose syrup, 175.4 g of glucose fructose syrup, and 0.450 g of water-soluble raspberry flavor were separately mixed together and heated to 45° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. The mixture was mixed for a further 10 minutes, during which time the temperature of the mixture decreased to 33° C. Water from a water bath at 20° C. was then circulated through the jacket of the mixer bowl, and mixing of the product continued until the temperature reached 27° C. or the product gained opacity. At this point the mixer and water circulation were stopped, and the mixture was stirred with a spoon, and then placed into sterile containers or deposited into chocolate shells.

EXAMPLE 8

An emulsion according to at least the first and eighth aspects was prepared according to the following process. 1.8 g of palm oil and 1.1 g of cocoa butter were melted and mixed. 0.2 g of polyglycerol polyricinoleate and 0.7 g of mono- and diglycerides were added to the fat mixture with stirring, and the resultant mixture heated to 60° C. 96.3 g of glucose syrup 63DE was separately heated to 50° C. The fat mixture was placed in the bowl of a jacketed planetary-action mixer, water from a water bath at 20° C. was circulated through the jacket of the mixer bowl, and the mixer switched on at medium speed. The aqueous syrup was added gradually to the mixer bowl, repeatedly scraping the sides of the mixer bowl to ensure uniformity. Once all the syrup had been added, mixing of the product was continued until the temperature reached 25° C., at which point the emulsion had a sticky texture. At this point the mixer and water circulation were stopped, and the mixture was stirred with a spoon, and then placed into sterile containers. The final product was a dense, chewy, hard, sticky and rubbery, jelly-like translucent product.

EXAMPLE 9

An emulsion according to at least the first, eleventh, fourteenth and seventeenth aspects was prepared according to the following process. 5.0 g of palm oil and 8.0 g of cocoa butter were melted and mixed. 0.5 g of polyglycerol polyricinoleate and 0.5 g of mono- and diglycerides were added to the fat mixture with stirring, and the resultant mixture heated to 60° C. 84.9 g of polydextrose solution was separately heated to 50° C., 0.5 g of blue cheese flavor was added, and 0.6 g of sodium chloride was dissolved in the solution. The fat mixture was placed in the bowl of a jacketed planetary-action mixer, water from a water bath at 18° C. was circulated through the jacket of the mixer bowl, and the mixer switched on at medium speed. The aqueous syrup was added gradually to the mixer bowl over a 2 minute period, repeatedly scraping the sides of the mixer bowl to ensure uniformity. Once all the syrup had been added, mixing of the product was continued until the temperature reached 24° C., at which point the emulsion became thicker and gained opacity (becoming whiter). At this point the mixer and water circulation were stopped, and the mixture was stirred with a spoon, and then placed into sterile containers. The final product was a soft, opaque white product with a texture similar to a soft low fat spread. The flavor was salty, cheesy, creamy and fatty.

EXAMPLE 10

An emulsion according to at least the first, fourteenth and seventeenth aspects was prepared according to the following process. 5 g of palm oil and 8 g of cocoa butter were melted and mixed. 0.5 g of polyglycerol polyricinoleate and 0.5 g of mono- and diglycerides were added to the fat mixture with stirring, and the resultant mixture heated to 60° C. 83.8 g of LITESSE ULTRA™ polydextrose syrup was separately heated to 45° C. and 0.8 g of chocolate flavor was added. The fat mixture was placed in the bowl of a jacketed planetary-action mixer, water from a water bath at 18° C. was circulated through the jacket of the mixer bowl, and the mixer switched on at low-medium speed. The aqueous syrup was added gradually to the mixer bowl over a one minute period, repeatedly scraping the sides of the mixer bowl to ensure uniformity. Once all the syrup had been added, mixing of the product was continued until the temperature reached 30° C., at which point 1.4 g of sieved milled cocoa powder was added gradually. Mixing was continued until the temperature of the mixture reached 24° C. and the mixture became thicker and gained opacity (becoming whiter). At this point the mixer and water circulation were stopped, and the mixture was stirred with a spoon, and then placed into sterile containers. The final product was soft and brown, with a texture and mouthfeel similar to a soft low fat spread. The flavor was chocolatey, creamy and fatty.

EXAMPLE 11

An emulsion according to at least the first and seventeenth aspects was prepared according to the following process. 5.0 g of palm oil and 8.0 g of cocoa butter were melted and mixed. 0.5 g of polyglycerol polyricinoleate and 0.5 g of mono- and diglycerides were added to the fat mixture with stirring, and the resultant mixture heated to 60° C. 0.0002 g of carmoisine was separately dissolved in 0.06 g of water, and 0.14 g of sucrose, 0.2 g of citric acid, and 0.2 g of strawberry flavor were added. The aqueous mixture was stirred and heated until the sugar had dissolved, and 33.7 g of glucose fructose syrup and 51.7 g of glucose syrup 63DE were added. The aqueous mixture was then heated to 45° C. The fat mixture was placed in the bowl of a jacketed planetary-action mixer, water from a water bath at 18° C. was circulated through the jacket of the mixer bowl, and the mixer switched on at low-medium speed. The aqueous mixture was added gradually to the mixer bowl over a one minute period, repeatedly scraping the sides of the mixer bowl to ensure uniformity. Once all the syrup had been added, mixing of the product was continued until the temperature reached 24° C. and the mixture became thicker and gained opacity (becoming whiter). At this point the mixer and water circulation were stopped, and the mixture was stirred with a spoon, and then placed into sterile containers. The final product was soft and pink, with a texture and mouthfeel similar to a soft low fat spread. The flavor was sweet, fruity, creamy, fatty, and acid.

EXAMPLE 12

An emulsion according to at least the first and twentieth aspects was prepared according to the following process. 50 g of palm oil and 70 g of cocoa butter were melted and mixed. 5 g of polyglycerol polyricinoleate, 5 g of mono- and diglycerides, and 1.53 g of flavors (1.0 g of coffee flavor, 0.13 g of chocolate flavor, 0.2 g of vanillin and 0.2 g of vanilla flavor) were added to the fat mixture with stirring, and the resultant mixture heated to 55° C. 580 g of high maltose syrup and 249.5 g of glucose fructose syrup were separately mixed together and heated to 35° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. Once all the syrup had been added, mixing of the product was continued for 10 minutes until the temperature reached 36° C. Water from a water bath at 20° C. was then circulated through the jacket of the mixer bowl to cool the mixture to 31° C. At this point 20 g of skimmed milk powder and 30 g of non-alkalised cocoa powder were added gradually with further mixing. Once all of the solid material had been added, mixing was continued until the temperature reached 24° C. and the product gained opacity. At this point the mixer and water circulation were stopped, and the mixture was stirred with a spoon, and then placed into sterile containers. The final product had a strong coffee flavor with very good taste and texture.

EXAMPLE 13

An emulsion according to at least the first and twentieth aspects was prepared according to the following process. 55 g of palm oil and 75 g of cocoa butter were melted and mixed. 3 g of polyglycerol polyricinoleate, 3 g of mono- and diglycerides, and 0.2 g of fat-soluble orange flavor were added to the fat mixture with stirring, and the resultant mixture heated to 55° C. 600 g of high maltose syrup, 260 g of glucose fructose syrup and 0.2 g of water-soluble orange flavor were separately mixed together and heated to 35° C. The fat mixture was placed in the bowl of a jacketed planetary-action mixer, and the mixer switched on at low-medium speed. The aqueous mixture was added gradually to the mixer bowl over a one minute period, repeatedly scraping the sides of the mixer bowl to ensure uniformity. Once all the syrup had been added, mixing of the product was continued for 10 minutes until the temperature reached 36° C. Water from a water bath at 20° C. was then circulated through the jacket of the mixer bowl to cool the mixture to 31° C. At this point 30 g of silk sugar were added gradually with further mixing. Once all of the solid material had been added, mixing was continued until the temperature reached 24° C. and the product gained opacity. At this point the mixer and water circulation were stopped, and the mixture was stirred with a spoon, and then placed into sterile containers. The final product had a slightly hard texture, and might be improved by increasing the silk sugar content and slightly reducing the emulsifier content.

EXAMPLE 14

A chocolate confectionery product was manufactured in which an emulsion of Example 1 was used.

The emulsion of Example 1 was prepared and maintained at approximately 27° C. In the meantime milk chocolate (CADBURY DAIRY MILK®) was melted and then kept at approximately 27° C.

The emulsion was then mixed in to the chocolate using a Hobart mixer, in a 25:75 ratio of emulsion:chocolate, and then deposited into starch moulds. The resultant chocolate confectionery composition was left to cool to room temperature in order to solidify the composition, and a solid bar of chocolate containing homogeneously-dispersed emulsion was formed, which had excellent taste and mouthfeel characteristics.

The emulsions of any aspects of the invention may be incorporated into chocolate in the same manner.

EXAMPLE 15

Chocolate containing fillings comprising the emulsions of Examples 1 to 13 was prepared in the following manner:

The emulsions of each of Examples 1 to 13 were incorporated as fillings in milk chocolate shells by utilising the shell moulding process described in "Chocolate, Cocoa and Confectionery," Minifie, B. W., third edition, pp 201-207 (published by Aspen publications)(and incorporated herein by reference). The temperature of deposition of the emulsions into the chocolate shells was approximately 25° C.

EXAMPLE 16

Chocolate enrobing of fillings comprising the emulsions of Examples 1 to 13 was carried out in the following manner:

The emulsions of each of Examples 1 to 13 were incorporated as fillings with milk chocolate coatings by utilising the enrobing process described in "Chocolate, Cocoa and Confectionery," Minifie, B. W., third edition, pp 208-218 (published by Aspen publications)(and incorporated herein by reference). The temperature of the enrobing chocolate was maintained at approximately 30° C.

The invention claimed is:

1. A confectionery water-in-oil emulsion comprising a fat phase; an emulsifier; and an aqueous phase; wherein the fat phase comprises a first tempering fat that can exist in more than one crystal form, present substantially in a single crystal form having a first melting point; and a second non-tempering fat having a second melting point lower than the first melting point.

2. An emulsion as claimed in claim 1, wherein the first tempering fat is cocoa butter.

3. An emulsion as claimed in claim 2, wherein the second non-tempering fat is palm oil.

4. An emulsion as claimed in claim 1, wherein the fat phase forms less than 15% of the emulsion.

5. A chocolate composition comprising an emulsion as claimed in claim 1.

6. A chocolate composition as claimed in claim 5, wherein the emulsion is present as a filling.

7. A chocolate composition as claimed in claim 5, wherein the emulsion is distributed throughout at least a portion of the chocolate composition.

8. A method of making a confectionery water-in-oil emulsion, comprising
    blending a first tempering fat that can exist in more than one crystal form and having a first melting point, at a temperature above the first melting point, with a non-tempering second fat having a second melting point lower than the first melting point, to form a fat phase;
    mixing an emulsifier with the fat phase;
    providing an aqueous phase;
    mixing the fat phase and aqueous phase to form an initial emulsion; and
    cooling the emulsion to a temperature lower than the first melting point but greater than or equal to the second melting point thereby causing the first fat to adopt preferentially a single crystal form.

9. A method as claimed in claim 8, wherein the first fat is cocoa butter.

10. A method as claimed in claim 9, wherein the second fat is palm oil.

11. A method as claimed in claim 8, wherein the fat phase forms less than 15% of the emulsion.

12. A confectionery emulsion comprising a fat phase and an aqueous phase, the fat phase comprising a first flavoring and the aqueous phase comprising a second flavoring, wherein the fat phase comprises a first fat that can exist in more than one crystal form and is present in the emulsion substantially in a single crystal form having a first melting point, and a second fat having a second melting point lower than the first melting point.

13. A confectionery emulsion as claimed in claim 12, wherein the fat phase comprises a fat-soluble flavoring and the aqueous phase comprises a water-soluble flavoring.

14. A confectionery emulsion as claimed in claim 12, wherein the emulsion is a water-in-oil (W/O) emulsion.

15. A method of making an emulsion as claimed in claim 12, comprising melting a fat phase; mixing an emulsifier with the fat phase; providing an aqueous phase; adding the aqueous phase to the fat phase to form an emulsion; and cooling until a desired temperature is reached.

16. A confectionery water-in-oil emulsion comprising a fat phase and an aqueous phase, wherein the fat phase forms less than 6% of the emulsion and wherein the fat phase comprises a first tempering fat that can exist in more than one crystal form and is present in the emulsion substantially in a single crystal form having a first melting point, and a second non-tempering fat having a second melting point lower than the first melting point.

17. A confectionery emulsion as claimed in claim 16, wherein the aqueous phase comprises glucose syrup.

18. A water-in-oil emulsion comprising a fat phase and an aqueous phase, wherein the emulsion has a savory flavor, and wherein the fat phase comprises a first tempering fat that can exist in more than one crystal form and is present in the emulsion substantially in a single crystal form having a first melting point, and a second non-tempering fat having a second melting point lower than the first melting point.

19. An emulsion as claimed in claim 18, wherein the aqueous phase comprises polydextrose.

20. An emulsion as claimed in claim 18, wherein the fat phase forms less than 15% of the emulsion.

21. An emulsion as claimed in claim 18, wherein the emulsion comprises a flavoring.

22. A confectionery water-in-oil emulsion comprising a fat phase and an aqueous phase, wherein the emulsion is at least substantially sugar free, and wherein the fat phase comprises a first tempering fat that can exist in more than one crystal form, present substantially in a single crystal form having a first melting point and a second non-tempering fat having a second melting point lower than the first.

23. A confectionery emulsion as claimed in claim 22, wherein the aqueous phase comprises polydextrose.

24. A confectionery emulsion as claimed in claim 23, wherein the polydextrose forms at least 70% of the emulsion.

25. A confectionery water-in-oil emulsion comprising a fat phase and an aqueous phase, wherein the fat phase comprises a first fat that can exist in more than one crystal form, present substantially in a single crystal form having a first melting point, a second fat having a second melting point lower than the first melting point; and the aqueous phase comprises a flavoring.

26. A confectionery emulsion as claimed in claim 25, wherein the first fat is cocoa butter.

27. A confectionery emulsion as claimed in claim 25, wherein the aqueous phase further comprises a bulk sweetener.

28. A water-in-oil emulsion comprising a fat phase, an aqueous phase, and a powdered component; wherein the fat phase comprises a tempering first fat that can exist in more than one crystal form, present substantially in a single crystal form having a first melting point and a non-tempering second fat having a second melting point lower than the first;

and the powdered component is distributed homogeneously throughout the fat phase.

29. An emulsion as claimed in claim 28, wherein the emulsion is a confectionery emulsion.

30. An emulsion as claimed in claim 28, wherein the powdered component is selected from cocoa powder, milk powder, and sugar, and mixtures of these.

31. An emulsion as claimed in claim 28, wherein the powdered component forms between 2 and 10% of the emulsion.

32. A method of making an emulsion as claimed in claim 28, comprising melting a fat phase; mixing an emulsifier with the fat phase; adding an aqueous phase to the fat phase to form an emulsion; adding a powdered component to the emulsion; and cooling until a desired temperature is reached.

33. A method of making an emulsion as claimed in claim 32, wherein the powdered component is added to the emulsion at between 28 and 32° C.

* * * * *